Figures 1, 2:
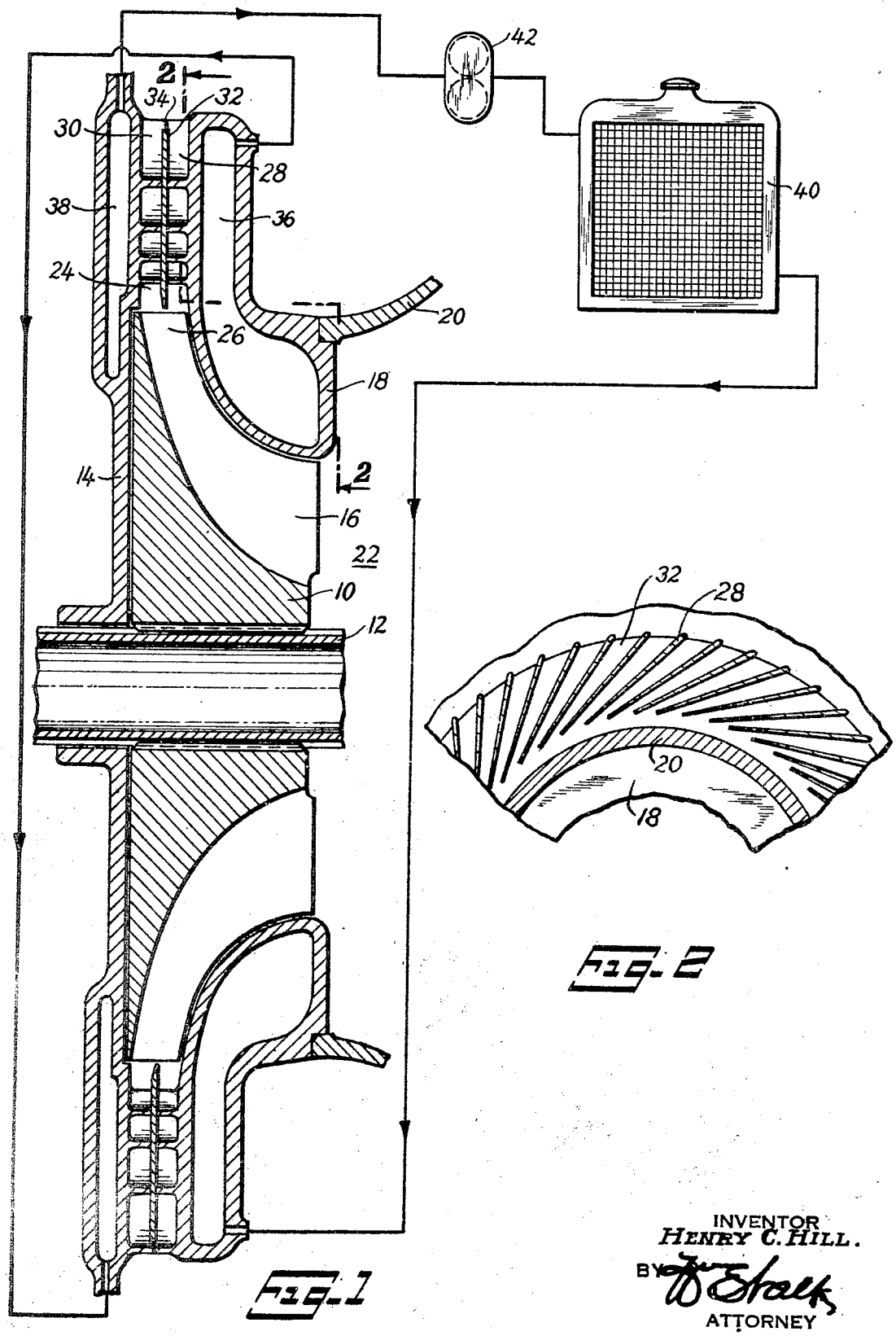

Sept. 4, 1945.  H. C. HILL  2,384,251

LIQUID COOLED SUPERCHARGER

Filed Jan. 14, 1943

INVENTOR
HENRY C. HILL.
BY
ATTORNEY

Patented Sept. 4, 1945

2,384,251

UNITED STATES PATENT OFFICE 2,384,251

LIQUID COOLED SUPERCHARGER

Henry C. Hill, Montclair, N. J., assignor to Wright Aeronautical Corporation, a corporation of New York Application January 14, 1943, Serial No. 472,424

3 Claims. (Cl. 230—209)

This invention relates to superchargers for internal combustion engines and is particularly concerned with the provision of cooling means for the output of the supercharger.

The supercharger impeller not only increases the pressure of the air or combustible mixture delivered by the impeller, but it also causes a considerable increase in the temperature of this air or combustible mixture. This increase in temperature decreases the power available from the engine. Accordingly, it is desirable to provide means for reducing the output temperature of the supercharger. It is an object of this invention to provide an efficient and compact supercharger cooling means which utilizes the conventional diffuser vanes as part of the heat exchange surface.

It is conventional practice to provide diffuser vanes at the output of the supercharger to slow down the output velocity of the air or combustible mixture delivered by the supercharger. Accordingly, it is an object of this invention to provide liquid cooling jackets about the diffuser housing whereby these diffuser vanes provide efficient heat exchange surfaces for cooling the output of the supercharger.

Further objects of the invention will become apparent in reading the annexed detailed description in connection with the drawing, in which:

Fig. 1 is an axial section through the supercharger impeller and diffuser housing; and Fig. 2 is a partial sectional view of the diffuser vanes to a reduced scale.

Referring to the drawing, a conventional centrifugal type supercharger impeller, indicated at 10, is drivably connected to the impeller shaft 12. The supercharger is provided with a rear housing wall 14 extending outwardly beyond the ends of the impeller blades 16. An annular shroud element 18 is supported in front of the impeller by a casing structure 20 to form an axial impeller intake eye 22. The outer ends of the wall 14 and shroud 18 form the front and rear walls respectively of an annular diffuser chamber 24 surrounding the output ends 26 of the impeller blades 16. The supercharger structure so far described is conventional and, as is usual in such superchargers, a plurality of diffuser vanes are provided in the diffuser chamber for reducing the radially outward velocity of the air or combustible mixture delivered by the supercharger. From this diffuser chamber the air or combustible mixture is distributed to the intake manifolds for the various cylinders of the engine.

In accordance with the present invention, these diffuser vanes are closely spaced about the impeller blades and comprise vanes 28 and 30 which are cast integral with the front and rear walls of the diffuser chamber 24. Each of these vanes extends approximately half way across the chamber 24 and an annular disc-like plate 32 is disposed between the opposed vanes 28 and 30 to insure good heat conductivity therebetween. A flange 34 formed at the outer ends of either or both of the sets of vanes 28 and 30 serves to retain the plate 32 in position. These vanes 28 and 30 are inclined substantially tangential to the circumferential path of the tip 26 of the impeller blades whereby these vanes act to reduce the output velocity of the air or combustible mixture delivered by the supercharger.

The front and rear walls of the diffuser chamber 24 are hollow to provide annular jackets 36 and 38 through which water or other cooling fluid may be circulated, as schematically illustrated in Fig. 1. Water or other cooling fluid is circulated through the jackets 36 and 38 and through a cooling radiator 40 by means of a pump 42. Accordingly, the diffuser vanes 28 and 30 also act as cooling fins for the supercharger output. This construction provides a metallic connection from each vane to the walls of both water jackets thereby providing a good heat conducting path from each of the vanes 28 or 30 to each of the jackets 36 and 38. The provision of the annular disc-like plate 32 between the vanes 28 and 30 makes it unnecessary to exactly align these vanes in order to provide a metallic heat conducting path between the jackets through the vanes. As illustrated, the liquid cooling jackets 36 and 38 are connected in series although obviously these jackets could be connected in parallel, if desired.

In operation, the supercharger impeller not only increases the pressure of the air or combustible mixture delivered by the supercharger, but it also increases the temperature of this air or combustible mixture. This increase in temperature of the air or combustible mixture decreases the power available from the engine. Accordingly, the provision of an after-cooler for reducing the temperature of the supercharger output is obviously desirable. However, from the above description it is seen that the cooling means herein described is quite compact and efficient and in fact, the conventional supercharger has been modified merely by placing a liquid cooling jacket around a diffuser chamber and the diffuser vanes have been placed close together and modified to secure good heat transfer. Accordingly, except for an increase in the number of diffuser vanes, the cooling means herein described does not provide any additional restrictions to air flow over and above that already present in conventional superchargers. Also, it should be noted that the diffuser vanes 28 and 30 not only have their usual function of reducing the velocity of the air or combustible mixture delivered by the supercharger, but in addition these vanes act as cooling fins for cooling this air or combustible mixture. In fact, the exceptionally high velocity of the air or combustible mixture striking the diffuser vanes greatly increases the amount of heat transferred as compared to that normally obtained with air cooling.

In addition to the above described functions of the vanes 28 and 30, these vanes may also act as a flame quencher in case of backfires. In order to quench backfire flames fairly long and thin passages having good heat transfer are required. Thus, the closely spaced cooling fins 28 and 30 are ideally constructed as a flame quencher in case of backfires. This is quite an important feature since the explosive pressure of a backfire may damage engine parts. In addition, backfires present a dangerous fire hazard because of accumulated fuel in the induction system. Thus, as a result of a backfire, the accumulated fuel in the induction system may burn after the engine has stopped and because of the closed-in air passages, such a fire may not be observed.

From the above description it is seen that the vanes 28 and 30 have three functions, namely, (1) to reduce the output velocity of the air or combustible mixture delivered by the supercharger impeller, (2) to cool the air or combustible mixture delivered by the supercharger, and (3) to act as a flame quencher in case of backfires in the induction system. This is all accomplished simply by closely spacing the diffuser vanes and by providing a liquid cooled jacket for the diffuser chamber and heat exchange relation with these vanes.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a fluid compressor, an annular diffuser chamber receiving the compressor output and having axially-spaced walls, each of said spaced walls comprising one wall of a liquid coolant jacket, a first set of diffuser vanes integral with and extending inwardly into said annular chamber from one of said opposed axially-spaced walls, a second set of diffuser vanes integral with and extending inwardly into said annular chamber from the other of said opposed axially spaced walls, and an annular member disposed between the inner edges of said two sets of diffuser vanes, at least one of said sets of diffuser vanes having flange means for supporting said annular member.

2. In a fluid compressor, an annular diffuser chamber receiving the compressor output and having axially-spaced walls, each of said spaced walls comprising one wall of a liquid coolant jacket, a first set of diffuser vanes integral with and extending inwardly into said annular chamber from one of said opposed axially-spaced walls, a second set of diffuser vanes integral with and extending inwardly into said annular chamber from the other of said opposed axially-spaced walls in substantial alinement with said first set of vanes, the inner edges of said two sets of vanes terminating in spaced relation to each other, and a substantially-flat annular member disposed between the inner edges of said two sets of diffuser vanes and against which said vanes abut, at least one of said sets of diffuser vanes having flange means for supporting said annular member.

3. In a fluid compressor, an annular diffuser chamber receiving the compressor output and having axially-spaced walls, each of said spaced walls comprising one wall of a liquid coolant jacket, a first set of diffuser vanes integral with and extending inwardly into said annular chamber from one of said axially-spaced walls, a second set of diffuser vanes extending integral with and extending inwardly into said annular chamber from the others of said axially-spaced walls, and a substantially-flat annular member disposed between the inner edges of said two sets of diffuser vanes, substantially the entire length of the inner edges of said diffuser vanes abutting against said annular member and at least one of said sets of diffuser vanes having flange means for supporting said annular member co-axial with said chamber.

HENRY C. HILL.